(12) United States Patent
Hsieh

(10) Patent No.: US 12,745,022 B2
(45) Date of Patent: Sep. 22, 2026

(54) DEVICE FOR DETECTION OF A CLIPPED RINGING SIGNAL

(71) Applicant: Nuvoton Technology Corporation, Hsinchu Science Park (TW)

(72) Inventor: Tsung-Hsien Hsieh, Taoyuan City (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 133 days.

(21) Appl. No.: 18/760,620

(22) Filed: Jul. 1, 2024

(65) Prior Publication Data

US 2025/0048005 A1 Feb. 6, 2025

(30) Foreign Application Priority Data

Jul. 31, 2023 (TW) ................................ 112128524

(51) Int. Cl.
*H04Q 1/36* (2006.01)
*H04M 1/654* (2006.01)
*H04M 19/02* (2006.01)

(52) U.S. Cl.
CPC .............. *H04Q 1/36* (2013.01); *H04M 1/654* (2013.01); *H04M 19/02* (2013.01)

(58) Field of Classification Search
CPC .. H04Q 1/36; H04Q 1/30; H04Q 1/03; H04M 1/654; H04M 19/02; H04M 19/042
See application file for complete search history.

(56) References Cited

U.S. PATENT DOCUMENTS 4,315,107 A * 2/1982 Ciesielka ................ H04M 1/76 379/400
5,001,748 A * 3/1991 Burns ................ H04M 19/023 379/252

(Continued)

FOREIGN PATENT DOCUMENTS

EP 450884 B1 6/1996
TW 200408255 A 5/2004

OTHER PUBLICATIONS

An Office Action (Notice of Allowance) in corresponding TW Application No. 112128524 dated Sep. 30, 2024 is attached, 7 pages.

*Primary Examiner* — Akelaw Teshale
(74) *Attorney, Agent, or Firm* — MUNCY, GEISSLER, OLDS & LOWE, P.C.

(57) ABSTRACT

A device for detection of a clipped ringing signal includes a ringing generator, a ringing signal adjusting-and-driving section, and a voltage-detection and clipping-judgment section. The ringing signal adjusting-and-driving section receives a ringing signal from the ringing generator. The ringing signal adjusting-and-driving section also receives a gain adjusting signal. The ringing signal adjusting-and-driving section outputs the ringing signal to a subscriber loop after adjusting the gain thereof according to the gain adjusting signal. The voltage-detection and clipping-judgment section is coupled to the subscriber loop to detect the loop voltage waveform of the subscriber loop, and to determine that the ringing signal is clipped when the loop voltage waveform is discontinuous. When the ringing signal is clipped, the voltage-detection and clipping-judgment section sends the gain adjusting signal to drive the ringing signal adjusting-and-driving section to attenuate the gain of the ringing signal.

7 Claims, 8 Drawing Sheets

(56) References Cited

U.S. PATENT DOCUMENTS

| | | | | |
|---|---|---|---|---|
| 5,283,818 | A * | 2/1994 | Klausner ............. | H04M 1/6505<br>379/199 |
| 5,453,716 | A * | 9/1995 | Person ................. | H03G 3/3005<br>381/107 |
| 7,010,120 | B2 * | 3/2006 | Noessing .............. | H04M 19/02<br>379/252 |
| 8,325,908 | B2 * | 12/2012 | Nagarajaiah .......... | H04M 19/04<br>379/404 |
| 2004/0071282 | A1 * | 4/2004 | Noessing .............. | H04M 19/02<br>379/395.01 |
| 2010/0030555 | A1 * | 2/2010 | Otani ...................... | G10L 21/02<br>704/224 |
| 2011/0033039 | A1 | 2/2011 | Nagarajaiah et al. | |

* cited by examiner

DEVICE FOR DETECTION OF A CLIPPED RINGING SIGNAL

CROSS REFERENCE TO RELATED APPLICATIONS

This Application claims priority of Taiwan Patent Application No. 112128524, filed on Jul. 31, 2023, the entirety of which is incorporated by reference herein.

BACKGROUND OF THE INVENTION

Field of the Invention

The present disclosure relates to a detection device, and in particular it relates to a device for detection of a clipped ringing signal, which adjusts the gain of a ringing signal by detecting whether the ringing signal is clipped or not.

Description of the Related Art

In a telephone communication system, signals are transmitted between a subscriber station and a central switching office through a twisted pair cable, and such signals include the signals transmitted by the "Tip" and the "Ring". The twisted pair cable, arranged between the subscriber station and the central switching office, is interfaced with the Subscriber Line Interface Circuit (SLIC). The functions performed by this SLIC are often called "BORSCHT".

Below, the functions of "BORSCHT" are briefly explained.

[B]: Battery Feeding

The SLIC can provide, between the Tip and Ring, a DC (direct current) voltage level for a call and the required current of a signal. In general, the amplitude (absolute value) of the DC voltage is 48V.

[O]: Over Voltage Protection

The telephone may be disturbed or interfered with by dangerous voltages from lightning strikes, fallen power lines, etc. Therefore, an arrestor, such as a gas tube or carbon block, may be provided at the central switching office. However, the line card must be able to withstand a 1000V surge.

[R]: Ringing

The SLIC is usually responsible for generating a ringing signal, generally having a root-mean-square (RMS) value of 86V, at a frequency of 20 Hz, and a periodicity of 2-second ON and 4-second OFF.

[S]: Signaling

The function of "Signaling" is often called "Supervision". The SLIC monitors the state of the subscriber circuit, and it mainly monitors the current of the subscriber loop to determine whether the phone is off the hook or on the hook. In addition, the SLIC also monitors the decoding of Dual-Tone Multi-Frequency (DTMF) code, Flash Hook, and other signals.

[C]: Coding

The function of Coding includes μ-Law coding in North America and A-Law coding in Europe. In addition, it also includes analog-to-digital conversion, digital-to-analog conversion, and companding and framing in time-division multiplexing.

[H]: Hybrid

This function realizes circuit conversion from two-wire to four-wire.

[T]: Testing

This function provides paths for testing battery voltage, loop current, ringing voltage, Tip-to-Ring resistance, Tip-to-ground resistance, and Ring-to-ground resistance.

As mentioned above, the RMS value of a ringing signal is generally 86V (peak to peak value is about 120V). This means that the SLIC must provide a voltage of more than 120V to maintain the ringing signal integrity. When the Ringer Equivalent Number (REN) is increased, it represents an increasing load on the entire subscriber line, and more power is required to maintain the desired ringing voltage. However, when the battery feeding cannot provide sufficient power, the ringing signal is clipped; that is, the waveform of the ringing signal is cut or twisted.

FIG. 1A shows a waveform of a ringing signal (which includes a Tip signal and a Ring signal) when the Ringer Equivalent Number is equal to 1 (REN=1). FIG. 1B shows a waveform of a ringing signal when the REN=3. In the case of FIG. 1A (REN=1), the battery feeding can provide sufficient power to main the waveform of the ringing signal. In the case of FIG. 1B, the load on the subscriber line increases to REN=3, and the Tip signal and the Ring signal cannot reach the peak value because the battery feeding fails to provide sufficient power. Therefore, the ringing signal is clipped and distorted.

Users do not want to hear distorted ringing signals. Usually, methods such as increasing supply of the power or reducing the gain of the ringing signal are used to try to ensure the integrity of the ringing signal waveform. However, no matter what to increase the supply of the power or reduce the gain of the ringing signal, first of all, whether the ringing signal is clipped or not must be detected. Only by successfully detecting and confirming that the ringing signal is clipped, improvements can be achieved by increasing supply of the power or reducing the gain of the ringing signal.

BRIEF SUMMARY OF THE INVENTION

Accordingly, the present disclosure provides a device for detection of a clipped ringing signal. The detection of the clipped ringing signal is independent of the amplitude and frequency of the ring signal, and the threshold for the detection does not need to change with the amplitude of the ringing signal.

The present disclosure provides a device for detection of a clipped ringing signal, which includes a ringing generator, a ringing signal adjusting-and-driving section, and a voltage-detection and clipping-judgment section. The ringing generator is configured to generate a ringing signal according to a ringing parameter. The ringing signal adjusting-and-driving section is configured to receive the ringing signal and a gain adjusting signal, and attenuate or maintain the gain of the ringing signal according to the gain adjusting signal, to subsequently output the ringing signal to a subscriber loop. The voltage-detection and clipping-judgment section is coupled to the subscriber loop, and configured to detect the voltage waveform at the subscriber loop or the voltage waveform corresponding to the ringing signal, thereby determining whether the ringing signal is clipped or not, according to whether the detected waveform is continuous or not. In response to the determination that the ringing signal is clipped, the ringing signal adjusting-and-driving section is driven, by the gain adjusting signal, to attenuate the ringing signal.

In some embodiment of the disclosure, the voltage-detection and clipping-judgment section further includes a voltage detection unit, and a clipping judgment unit. The voltage detection unit is configured to obtain the voltage waveform. The clipping judgment unit is configured to execute the following operations. (1) For each detection point of the voltage waveform, calculate a left-hand limit and a right-hand limit of each detection point. (2) Determine whether the difference between the left-hand limit and the right-hand limit is more than or equal to a predetermined threshold. (3) In response to the difference between the left-hand limit and the right-hand limit more than or equal to the predetermined threshold, determine that the voltage waveform is discontinuous. (4) In response to the determination that the voltage waveform is discontinuous, the gain adjusting signal is output to drive the ringing signal adjusting-and-driving section for attenuating the gain of the ringing signal.

In some embodiment of the disclosure, the voltage-detection and clipping-judgment section further includes a low-pass filter, coupled between the voltage detection unit and the clipping judgment unit, and configured to perform low-pass filtering to the voltage waveform, and subsequently output the filtered voltage waveform to the clipping judgment unit.

In some embodiment of the disclosure, the clipping judgment unit further includes a limit calculator, and a comparator. The limit calculator is configured to receive the voltage waveform and calculate the left-hand limit and the right-hand limit of each detection point. The comparator compares the difference between the left-hand limit and the right-hand limit with the predetermined threshold, and in response to the difference being more than or equal to the predetermined threshold, the comparator outputs the gain adjusting signal to drive the ringing signal adjusting-and-driving section for attenuating the gain of the ringing signal.

In some embodiment of the disclosure, in response to the difference being less than the predetermined threshold, the comparator drives the ring signal adjusting-and-driving section, by the gain adjusting signal, to maintain the gain of the ringing signal at 0 dB.

In some embodiment of the disclosure, the voltage waveform of the ringing signal is a Tip voltage waveform or a Ring waveform.

In some embodiment of the disclosure, the Tip voltage waveform is a sine (or cosine) waveform, and the Ring waveform is a cosine (or sine) waveform.

In some embodiment of the disclosure, the predetermined threshold is a fixed value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

One function of the SLIC (Subscriber Line Interface Circuit) is to generate the ringing signal, and it can control the amplitude, frequency, ON/OFF duty of the ringing signal. In addition, a feedback path is provided to the SLIC for monitoring the state of the subscriber line (or loop), for example, monitoring the peek-loop voltage (VTIP−VRING), where VTIP is the voltage of the Tip signal on the subscriber line, and VRING is the voltage of the Ring signal on the subscriber line.

Figure 1A:
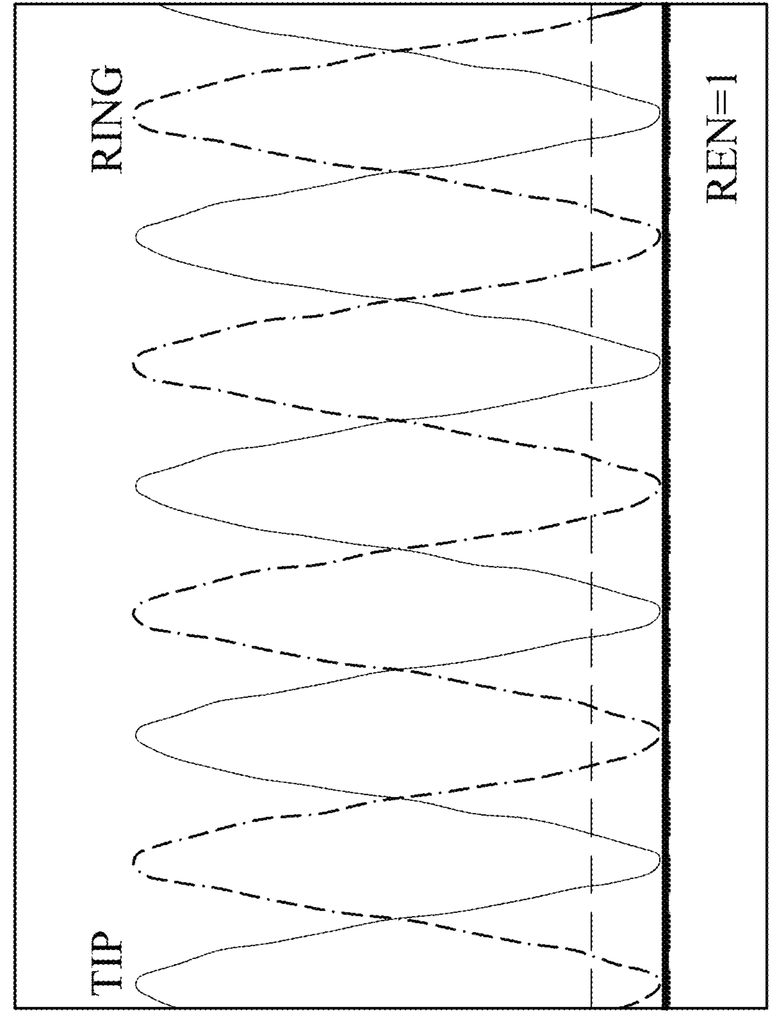
FIG. 1A shows a waveform of a ringing signal (including Tip/Ring signal) when the Ringer Equivalent Number is equal to 1 (REN=1).
Figure 1A:
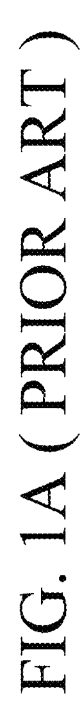
Figure 1B:
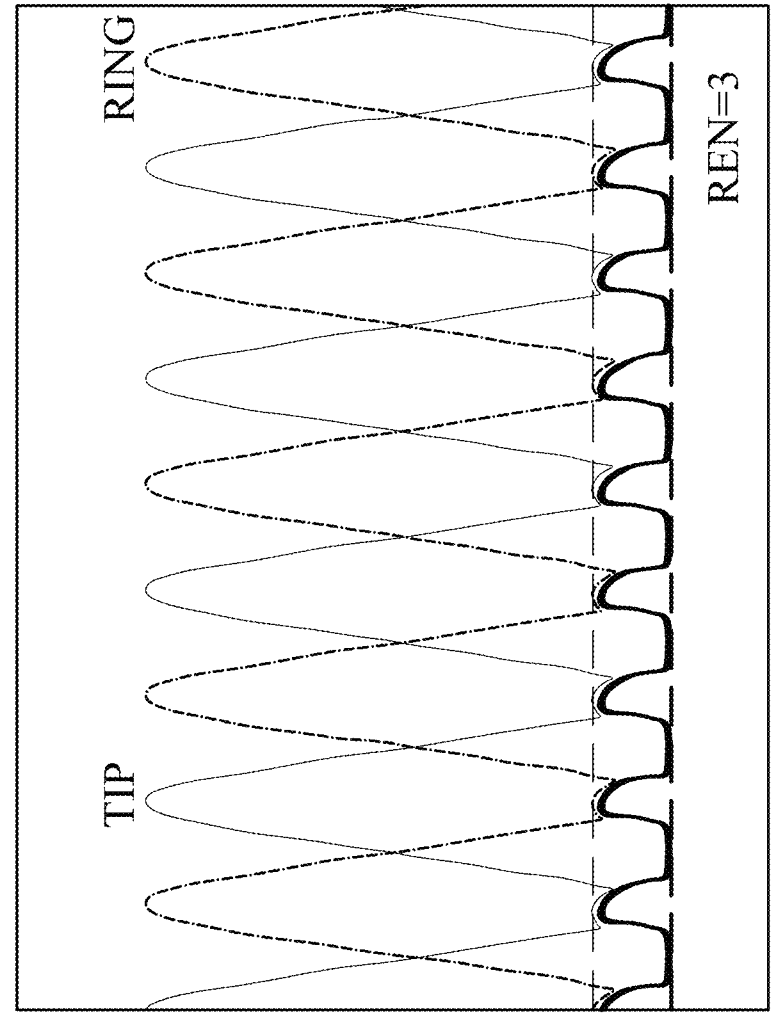
FIG. 1B shows a waveform of a ringing signal when the REN=3.

It can be seen from FIG. 1A and FIG. 1B, the absolute value of the peek-loop voltage |VTIP−VRING| is decreased when the ringer equivalent number changes from REN=1 to REN=3. At the same time, the ringing signal on the subscriber line is clipped, and such characteristics can be used for detection of a clipped ringing signal. When the peak-loop voltage on the subscriber line is detected to be less than the predetermined threshold, signal clipping can be considered to have occurred.

Under this detection structure, the monitored peak value of the loop voltage on the subscriber line is compared with an absolute predetermined threshold without a common reference value. Such detection structure is called "the detector without reference voltage".

Figure 2:
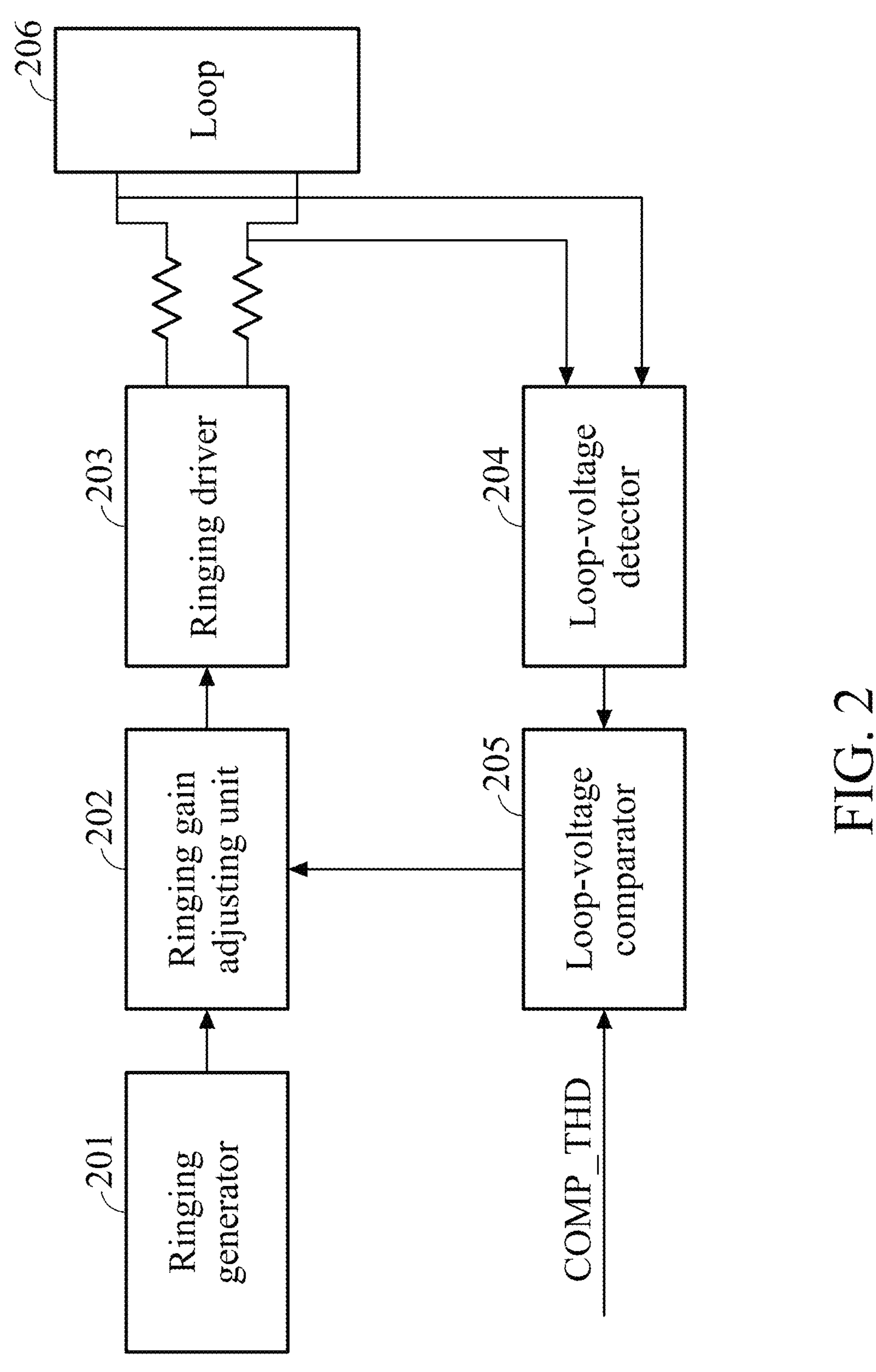
FIG. 2 shows a schematic diagram of a device 200 for detection of a clipped ringing signal, without reference voltage.

FIG. 2 shows a schematic diagram of a device 200 for detection of a clipped ringing signal, without reference voltage. The device 200 for detection of a clipped ringing signal includes a ringing generator 201, a ringing gain adjusting unit 202, a ringing driver 203, a loop-voltage detector 204, and a loop-voltage comparator 205. The ringing generator 201 generates a corresponding ringing signal (including a Tip signal and a Ring signal), according to (programed) parameters for setting such as amplitude, frequency, ON/OFF duty. The ringing gain adjusting unit 202 receives the ringing signal to attenuate the ringing signal by a predetermined gain when signal clipping happens, and to maintain the gain at 0 dB when signal clipping does not happen. The ringing driver 203 receives the adjusted gain output by the gain adjusting unit 202, and output the ringing signal to drive the loop (i.e., the subscriber line) 206. The loop-voltage detector 204 monitors and obtains the voltages of the Tip signal and the Ring signal on the loop 206. The loop-voltage comparator 205 compares the peak voltage of the Ring signal or the Tip signal on the loop 206 with a predetermined threshold COMP_THD. When the peak-loop voltage is less than the predetermined threshold COMP_THD, the loop-voltage comparator 205 outputs the adjusting signal to the ringing gain adjusting unit 202 to attenuate the ringing signal.

In FIG. 2, although the device 200 for detection of a clipped ringing signal has simple and high cost-effective structure, its main disadvantage is that the predetermined threshold COM_THD must change with the amplitude of the ringing signal.

When the amplitude of the ringing signal is large, the threshold must be set larger, otherwise the signal clipping event may never occur. However, when the amplitude of the ringing signal becomes smaller, the threshold must be lowered accordingly, otherwise the signal clipping event may always occur. In this way, all the required mapping relationship information between the ringing amplitude and the clipping threshold must be prepared for the subscriber, which will complicate the programming process.

Figure 3:
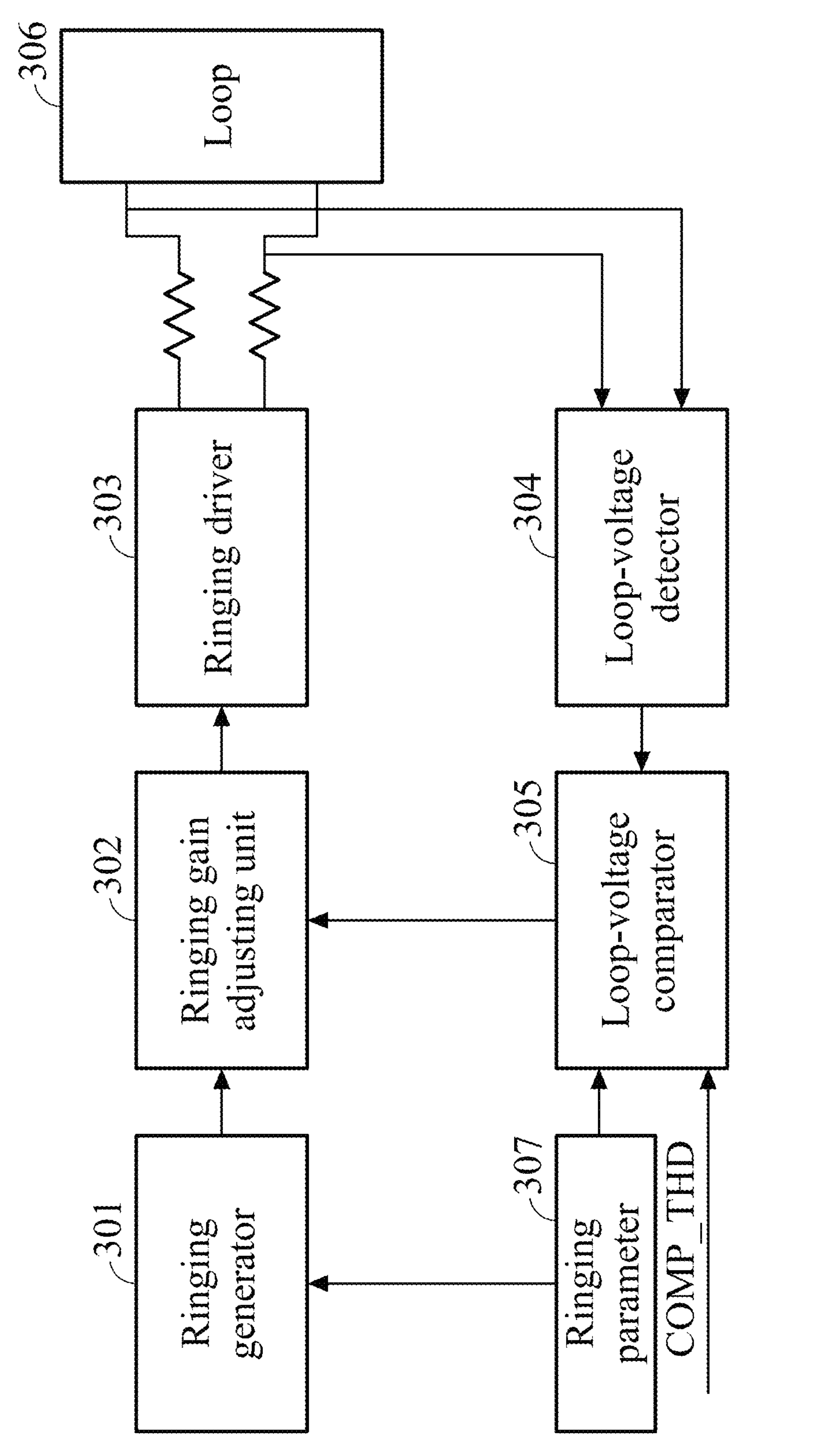
FIG. 3 shows a schematic diagram of a device 300 for detection of a clipped ringing signal, with reference voltage.

In order to improve the aforementioned device 200 for detection of a clipped ringing signal, “the detection device with reference voltage” is proposed. FIG. 3 shows a schematic diagram of a device 300 for detection of a clipped ringing signal, with reference voltage. The device 300 for detection of a clipped ringing signal includes a ringing generator 301, a ringing gain adjusting unit 302, a ringing driver 303, a loop-voltage detector 304, and a loop-voltage comparator 305. The operations of the ringing generator 301, the ringing gain adjusting unit 302, the ringing driver 303, and the loop-voltage detector 304 are the same as that described in FIG. 2, and their descriptions are omitted here for the brevity.

The ringing parameter 307 is provided to the ringing generator 301 and the loop-voltage comparator 305. The loop-voltage comparator 305 receives the ringing parameter 307 and performs the calculation of the following equation (1).

$$DIFF = \text{RING\_AMP} \cdot (\text{VLOOP\_PEAK})/2 \tag{1}$$

Where the notation RING_AMP represents the amplitude of the setting ringing signal, the notation VLOOP_PEAK represents the peak value of the loop voltage obtained by monitoring the loop 306.

There is a fixed relationship between the peak value of the loop voltage (VLOOP_PEAK) obtained by monitoring the loop 306 and the amplitude (RING_AMP) of the ring signal set above, ideally as shown in the following equation (2).

$$\text{VLOOP\_PEAK} = 2 \times \text{RING\_AMP} \tag{2}$$

If no signal clipping occurs, the peak value of the loop voltage VLOOP_PEAK will be quite close to twice the amplitude RING_AMP of the ringing signal.

Apply equation (2) to equation (1), and the ringing amplitude detection criterion is as shown in equation (3).

$$\begin{cases} \text{IF } DIFF < \text{COMP\_THD, RING\_CLIP} = 1 \\ \quad\text{else RING\_CLIP} = 0 \end{cases} \tag{3}$$

Where, the COMP_THD is the threshold for detection of signal clipping. When RING_CLIP=1, signal clipping does not occur, and when RING_CLIP=0, signal clipping occurs.

The device 300 for detection of a clipped ringing signal in FIG. 3 can eliminate the dependency on the amplitude of the ringing signal, so a single threshold value COMP_THD can be applied to the amplitude of any size. However, due to frequency-selectivity, different frequency tones will be affected by different channel gains. Frequency selectivity causes the ringing signals (or RING_AMP voltages) with different frequencies but the same amplitudes to have different loop-voltage peak values VLOOP_PEAK on the loop 306 due to the influence of frequency. As a result, the relationship between the aforementioned equation (2) for the signals of different frequencies will not always be established. The influence of frequency selectivity may not be dramatic, but in the worst case, a programming table for various frequency tones may still be required.

Figure 4:
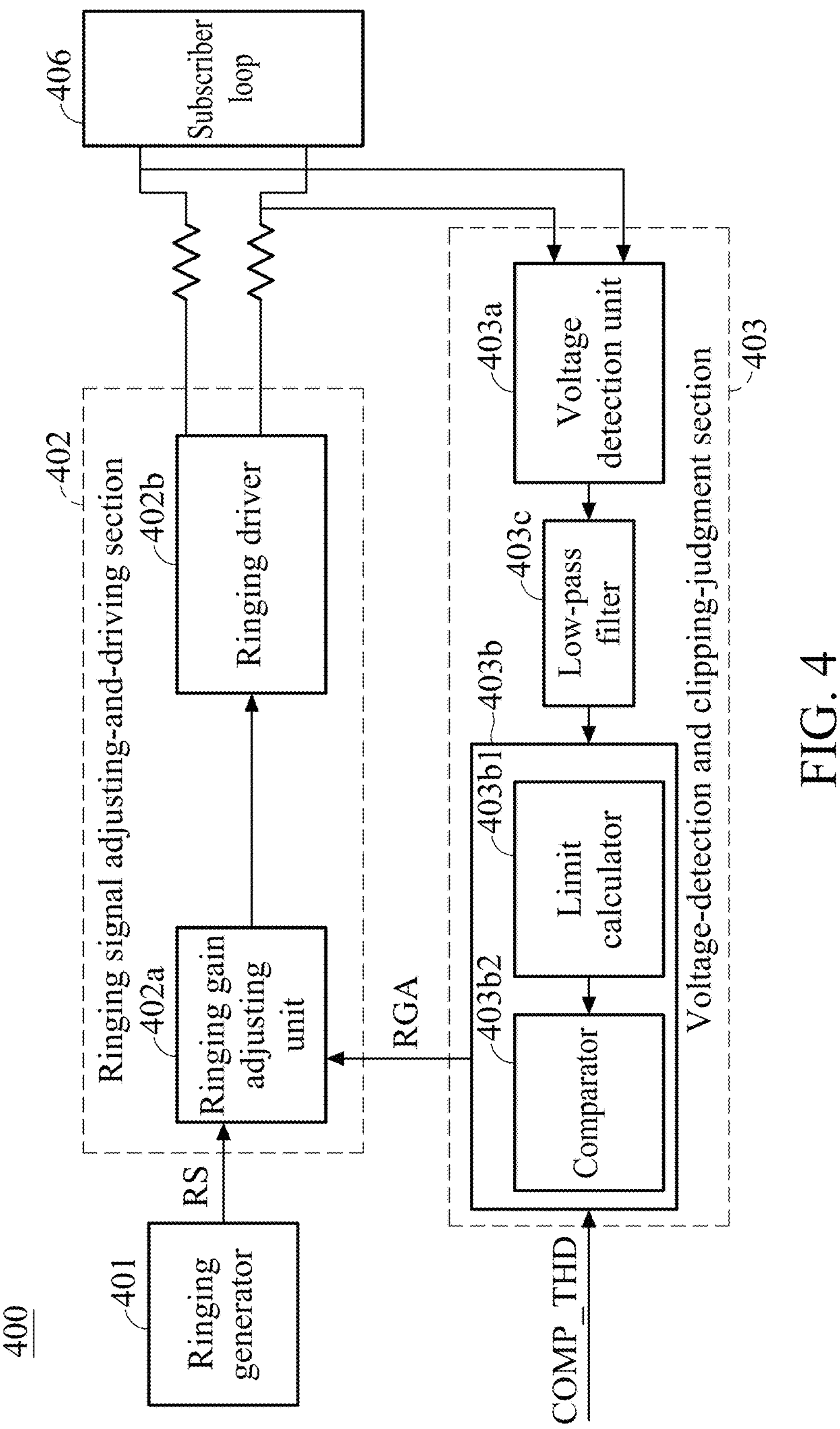
FIG. 4 shows a schematic diagram of a device 400 for detection of a clipped ringing signal according to the present disclosure.

FIG. 4 shows a schematic diagram of a device 400 for detection of a clipped ringing signal according to the present disclosure. In reference with FIG. 4, the device 400 for detection of a clipped ringing signal includes a ringing generator 401, a ringing signal adjusting-and-driving section 402, and a voltage-detection and clipping-judgment section 403.

The ringing generator 401 generates a ringing signal RS (which includes a Tip signal and a Ring signal), according to preset or programed parameters for setting such as amplitude, frequency, ON/OFF duty, and outputs the ringing signal RS to the ringing signal adjusting—and driving section 402. The waveforms of the ringing signal RS includes the voltage waveforms of the Tip signal and the Ring signal.

The ringing signal adjusting—and driving section 402 receives the ringing signal RS and a gain adjusting signal RGA, and attenuates the gain of the ringing signal RS or maintain the gain of the ringing signal RS according to the gain adjusting signal RGA, and subsequently outputs the ringing signal RS (after gain adjusted for driving) to the subscriber loop 406.

The voltage-detection and clipping-judgment section 403 is coupled to the subscriber loop 406, and the ringing signal adjusting—and driving section 402. The voltage-detection and clipping-judgment section 403 monitors the waveform of the Tip signal or the waveform of the Ring signal, and determines whether the monitored waveform is continuous or not, for judging whether the ringing signal RS, the Tip signal or the Ring signal is clipped or not. Where, when the ringing signal RS (or the Tip signal or the Ring signal on the subscriber loop 406) is determined to be clipped, the voltage-detection and clipping-judgment section 403, through the gain adjusting signal RGA, drives the ring signal adjusting-and-driving section 402 to attenuate the ringing signal RS. When the Tip signal or the Ring signal is clipped, the ringing signal RS will be also clipped accordingly. For the brevity, “determining whether the ring signal RS, or the Tip signal or Ring signal of the subscriber loop 406 is clipped” can be collectively referred to as “determining whether the ring signal RS is clipped or not”, below.

The voltage-detection and clipping-judgment section 403 further includes a voltage detection unit 403*a*, and a clipping judgment unit 403*b*. The voltage detection unit 403*a* detects and obtains the waveform of the ringing signal RS from the subscriber loop 406, that is the waveform of the Tip signal or the Ring signal. Below, the voltage waveform of the Ring signal is used as an example.

The clipping judgment unit 403*b* is configured to perform the following operations. (1) For each detection point of the Ring signal waveform, calculate a left-hand limit and a right-hand limit of each detection point. (2) Determine whether the difference between the left-hand limit and the right-hand limit is more than or equal to a predetermined threshold COMP_THD. (3) In response to the difference between the left-hand limit and the right-hand limit more than or equal to the predetermined threshold COMP_THD, determine that the Ring signal voltage waveform is discontinuous. (4) When it is determined that the Ring signal waveform is discontinuous, the gain adjusting signal RGA is output to drive the ringing signal adjusting-and-driving section 402 for attenuating the gain of the ringing signal RS.

The clipping judgment unit 403*b* further includes a limit calculator 403*b*1, and a comparator 403*b*2. The limit calculator **403*b*1 is configured to receive the Ring signal waveform and calculate the left-hand limit and the right-hand limit of each detection point in the Ring signal waveform. The comparator 403*b*2 is configured to compare the difference between the left-hand limit and the right-hand limit with the predetermined threshold COMP_THD. In response to the difference being more than or equal to the predetermined threshold COMP_THD, the comparator 403*b*2 outputs the gain adjusting signal RGA to drive the ringing signal adjusting-and-driving section 402 for attenuating the gain of the ringing signal RS. In addition, in response to the difference being less than the predetermined threshold COMP_THD, the comparator 403*b*2, by the gain adjusting signal RGA, drives the ringing signal adjusting-and-driving section 402** for maintaining the gain of the ringing signal RS to 0 dB.

Furthermore, the ringing signal adjusting-and-driving section 402 further includes a ringing gain adjusting unit **402*a*, and a ringing driver 402*b*. When the signal clipping occurred, for example, when receiving the gain adjusting signal RGA from the clipping-judging unit 403*b*, the ring gain adjusting unit 402*a* attenuates the ringing signal RS by a predetermined gain. Otherwise, when signal clipping did not occur, the ringing gain adjusting unit 402*a* maintains the gain of the ringing signal RS as 0 dB. The ringing driver 402*b* receives the adjusted gain output from the ringing gain adjusting unit 402*a*, to output the adjusted ringing signal RS to the subscriber loop 406**.

The voltage-detection and clipping-judgment section 403 further includes: a low-pass filter (LPF) **403*c*, coupled between the voltage detection unit 403*a* and the clipping judgment unit 403*b*, and configured to perform low-pass filtering to the voltage waveform of the ringing signal RS and subsequently output the filtered voltage waveform to the clipping judgment unit 403*b***.

Figure 5:
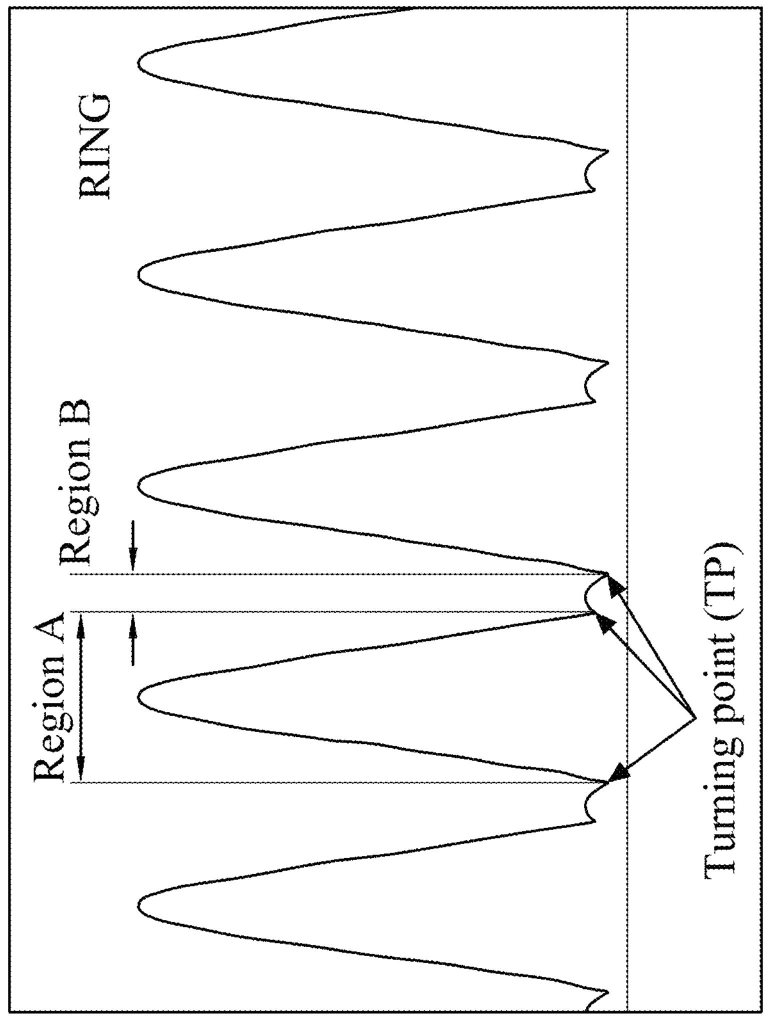
FIG. 5 shows the waveform of a clipped ringing signal.

FIG. 5 shows the waveform of a clipped ringing signal. Here, take the Ring signal waveform of the ringing signal RS as an example. In view of FIG. 5, the clipped Ring signal waveform periodically includes region A, turning point TP, and region B.

(i) Region A is a normal ringing region. In the region A, the waveform of the Ring signal is a continuous sine wave (the waveform of the Tip signal not shown in FIG. 5 is a continuous cosine wave). Therefore, from a mathematical point of view, every point of the Ringing signal waveform in the region A is differentiable.

(ii) Region B is a clipping region. In the region B, the clipped waveform may be continuous or discontinuous. Therefore, every point of the Ringing signal waveform in the region B may be differentiable or non-differentiable.

(iii) Regarding turning point TP, on one side of the turning point TP is a continuous sine wave, and on the other side of the turning point TP is a clipped waveform. Obviously, the turning point TP is discontinuous and non-differentiable.

In FIG. 5, only the voltage waveform of the ringing signal (Ring signal) in the region A does not suffer from clipping, and therefore each point of the waveform (in the region A) is differentiable. On the other hand, if the Ring signal waveform is clipped, there will be points in the waveform that are non-differentiable. Since the differentiability of the ringing signal waveform is independent of the amplitude and frequency of the ringing signal; therefore, some embodiments of the present disclosure can apply "differentiability" in clipping detection to determine whether the waveform is clipped or not, to remove the influence of the amplitude and frequency of the ringing signal.

For any point x=c on the function f(x), its limits can be defined as equation (4).

$$f'_{-c} = \lim_{x \to c^-} \frac{f(x) - f(c)}{x - c} \qquad (4)$$

$$f'_{+c} = \lim_{x \to c^+} \frac{f(x) - f(c)}{x - c}$$

Where, $f'_{-c}$ is the left-hand limit of the function f(x) at x=c, and $f'_{+c}$ is the right-hand limit of the function f(x) at x=c. If the equation (5)

$$f'_{-c} \neq f'_{+c}$$

is established, the function f(x) at x=c is non-differentiable (or discontinuous).

In actual clipping detection, to further consider the impact of environmental noise, the equation (5) can be modified as follows.

If equation (6):

$$|f'_{-c} - f'_{+c}| \geq \text{CMP\_THD},$$

is met, the function f(x) at x=c is non-differentiable and clipping occurs.

The following describes the operation of the voltage-detection and clipping-judgment section 403 in conjunction with the aforementioned equations (4) to (6) to perform voltage detection and clipping judgment.

As mentioned above (FIG. 4), the voltage-detection and clipping-judgment section 403 may include the voltage detection unit **403*a*, the low-pass filter 403*c*, and the clipping judgment unit 403*b*. The voltage detection unit 403*a* is coupled to the subscriber loop 406, and configured to monitor and obtain the waveform of the ringing signal RS (as described above, for example, the Ring signal waveform of the subscriber loop 406). In this exemplary embodiment, the voltage detection monitors the Ring signal waveform of the ringing signal RS, not the peak voltage. In addition, the voltage detection unit 403*a*** samples the voltage waveform of the Ring signal for at least one cycle, and the sampling frequency (for example, but not limited to) can be 8 k~16 k Hz.

The voltage waveform of the Ring signal obtained through sampling is further filtered by the low-pass filter **403*c* to filter out high-frequency noise, and then is input to the clipping-judgment unit 403*b***.

As described above, the clipping judgment unit **403*b* may include the limit calculator 403*b*1, and the comparator 403*b*2. The limit calculator 403*b*1 receives the voltage waveform (for example, the voltage wave form of the Ring signal), calculates the left-hand limit and the right-hand limit for each point of the voltage waveform. Afterwards, for each point of the voltage waveform, the comparator 403*b*2** performs a comparison based on the aforementioned equation (6), by comparing $$|f'_{-c} - f'_{+c}|$$

with the received predetermined threshold COMP_THD, to determine whether clipping occurs or not. It is worth noting that the predetermined threshold COMP_THD can be a fixed value, and can be set to 0.3-0.5, merely for example but not limited thereto. In other words, if any point meets the condition of equation (6):

$$|f'_{-c} - f'_{+c}| \geq \text{CMP\_THD},$$

the comparator **403*b*2 judges that clipping occurred in the ringing signal RS. At this time, the comparator 403*b*2 further outputs the gain adjusting signal RGA to the ringing gain adjusting unit 402*a* and the ringing driver 402*b* of the ring signal adjusting-and-driving section 420, to attenuate the ringing signal RS and then output it to the subscriber loop 406**.

Figure 6:
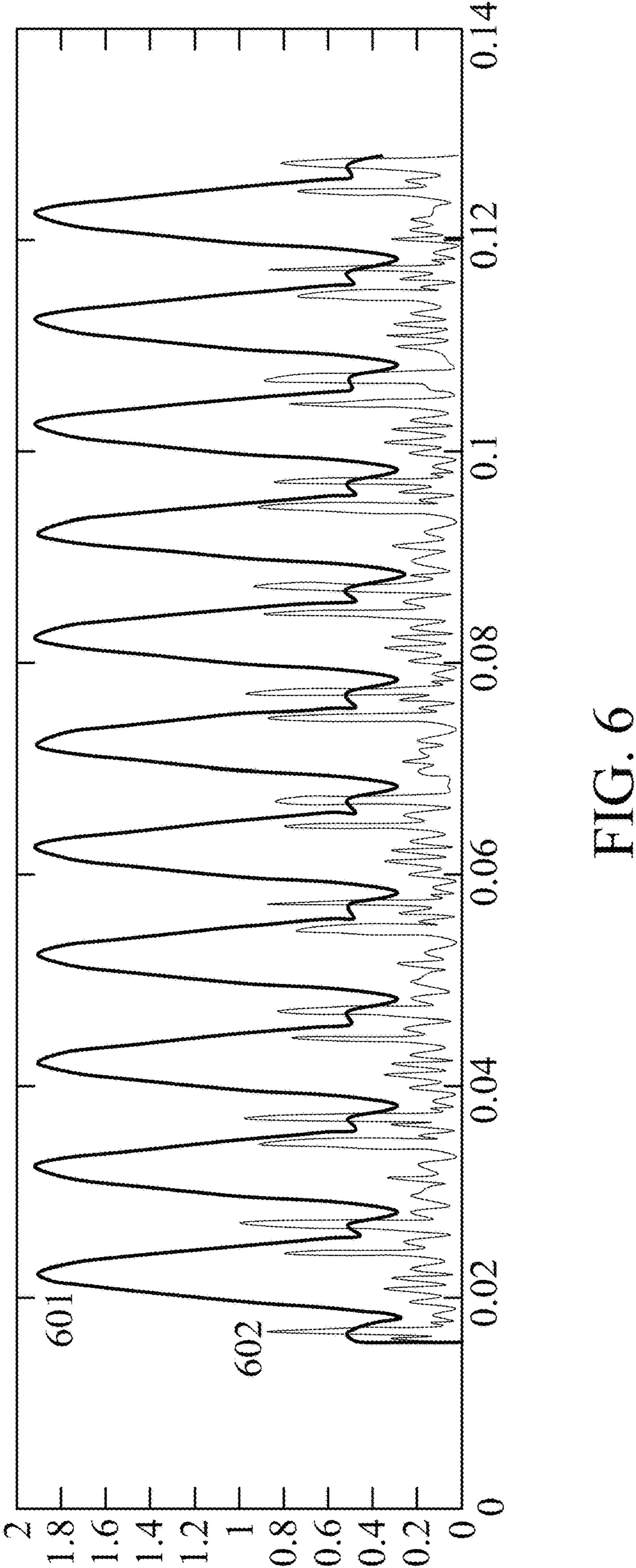
FIG. 6 and FIG. 7 show simulation results of the clipping detection.
Figure 7:
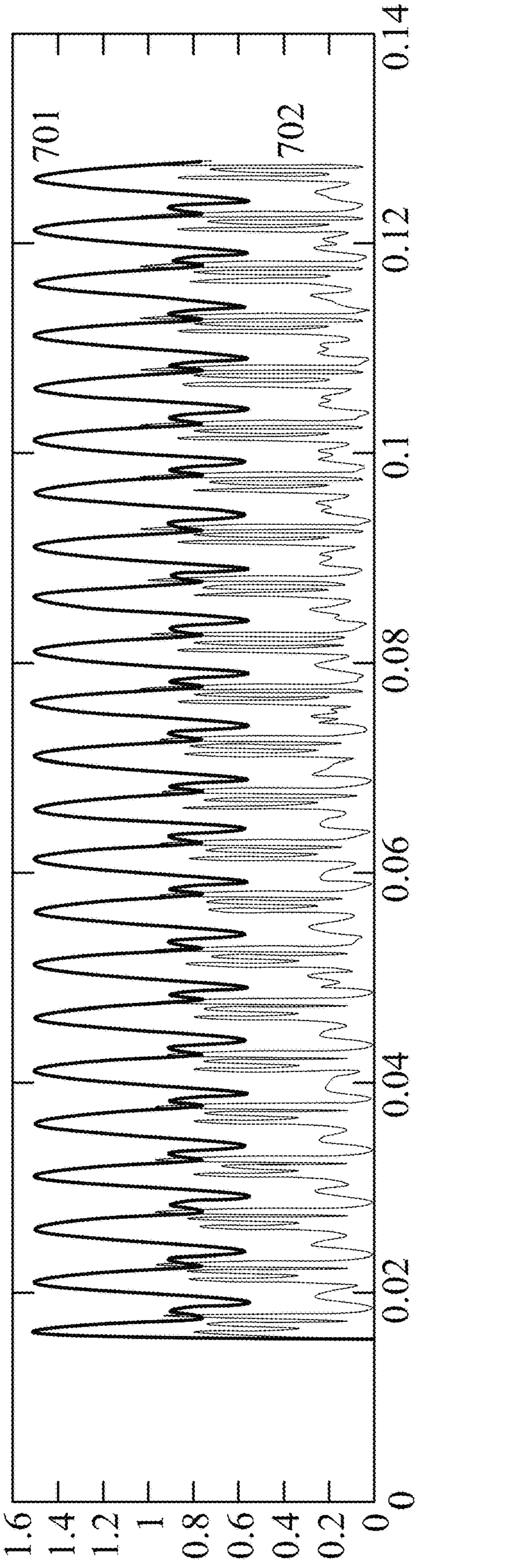

FIG. 6 and FIG. 7 show simulation results of the clipping detection.

In FIG. 6, the curve 601 represents the waveform of the ringing signal RS, taking the Ring signal as an example for illustration, the curve 602 represents the difference $$(|f'_{-c} - f'_{+c}|)$$

between the right-hand limit and the left-hand limit for each sampling point (detection point). The frequency of the ringing signal RS is 100 Hz, and the normalized peak-to-peak value (corresponding to the amplitude of the ringing signal) is 1.8. It can be seen from the simulation result, that the difference $$|f'_{-c} - f'_{+c}|$$

as shown in curve 602, corresponding to the region where the Ring signal waveform is not clipped in curve 601, is less than 0.4; and the difference $$|f'_{-c} - f'_{+c}|$$

as shown in curve 602, corresponding to the turning point of the Ring signal waveform in curve 601, is more than 0.8.

In FIG. 7, the curve 701 represents the waveform of the ringing signal, and the curve 702 represents the difference $$(|f'_{-c} - f'_{+c}|)$$

between the right-hand limit and the left-hand limit for each sampling point (detection point). The frequency of the ringing signal is 200 Hz, and the normalized peak-to-peak value (corresponding to the amplitude of the ringing signal) is 1.0. It can be seen from the simulation result, that the difference $$|f'_{-c} - f'_{+c}|$$

as shown in curve 702, corresponding to the region where the Ring signal waveform is not clipped in curve 701, is less than 0.4; and the difference $$|f'_{-c} - f'_{+c}|$$

as shown in curve 702, corresponding to the turning point of the Ring signal waveform in curve 701, is more than 0.8.

From the simulation results in FIG. 6 and FIG. 7, it can be proved that the device for detection of a clipped ringing signal according to the present disclosure can eliminate the dependency on the amplitude and frequency of the ringing signal. Therefore, a unified (or fixed) comparison threshold (COMP_THD) can be applied to the ringing signals of all frequencies and all amplitudes.

The ordinal numbers in this specification and the scope of the patent application, such as "first", "second", "third", etc., have no sequential relationship, priority order or precedence relationship with each other. They are only used to indicate and distinguish between two different components with the same name.

Although the present disclosure is disclosed above in terms of preferred embodiments, they are not intended to limit the scope of the invention. Anyone skilled in the art can make slight changes and modifications without departing from the spirit and scope of the invention. Therefore, the protection scope of the present invention shall be determined by the appended patent application scope.

What is claimed is:

1. A device for detection of a clipped ringing signal, comprising:

a ringing generator, configured to generate a ringing signal based on a ringing parameter;

a ringing signal adjusting-and-driving section, configured to receive the ringing signal and a gain adjusting signal, and attenuate or maintain a gain of the ringing signal based on the gain adjusting signal, to subsequently output the ringing signal to a subscriber loop; and a voltage-detection and clipping-judgment section, coupled to the subscriber loop, and configured to detect the voltage waveform at the subscriber loop or detect the voltage waveform corresponding to the ringing signal, thereby determining whether the ringing signal is clipped based on whether the detected waveform is continuous;

wherein in response to the determination that the ringing signal is clipped, the ringing signal adjusting-and-driving section is driven, by the gain adjusting signal, to attenuate the ringing signal.

2. The device for detection of a clipped ringing signal as claimed in claim 1, wherein the voltage-detection and clipping-judgment section includes:

a voltage detection unit, configured to obtain the voltage waveform; and a clipping judgment unit, configured to execute the following operations:

for each of detection points of the voltage waveform, calculating a left-hand limit and a right-hand limit of each of the detection points;

determining whether a difference between the left-hand limit and the right-hand limit is more than or equal to a predetermined threshold;

in response to the difference between the left-hand limit and the right-hand limit being more than or equal to the predetermined threshold, determining that the voltage waveform is discontinuous; and in response to the determination that the voltage waveform is discontinuous, outputting the gain adjusting signal to drive the ringing signal adjusting-and-driving section for attenuating the gain of the ringing signal.

3. The device for detection of a clipped ringing signal as claimed in claim 2, wherein the voltage-detection and clipping-judgment section further comprises:

a low-pass filter, coupled between the voltage detection unit and the clipping judgment unit, and configured to perform low-pass filtering to the voltage waveform, and subsequently output the filtered voltage waveform to the clipping judgment unit.

4. The device for detection of a clipped ringing signal as claimed in claim 2, wherein the clipping judgment unit includes:

a limit calculator, configured to receive the voltage waveform and calculate the left-hand limit and the right-hand limit of each of the detection points; and a comparator, configured to compare the difference between the left-hand limit and the right-hand limit with the predetermined threshold;

in response to the difference being more than or equal to the predetermined threshold, the comparator outputs the gain adjusting signal to drive the ringing signal adjusting-and-driving section for attenuating the gain of the ringing signal.

5. The device for detection of a clipped ringing signal as claimed in claim 4, wherein in response to the difference being less than the predetermined threshold, the comparator, using the gain adjusting signal, drives the ring signal adjusting-and-driving section, to maintain the gain of the ringing signal at 0 dB.

6. The device for detection of a clipped ringing signal as claimed in claim 1, wherein the voltage waveform of the ringing signal is a sine waveform or a cosine waveform.

7. The device for detection of a clipped ringing signal as claimed in claim 2, wherein the predetermined threshold is a fixed value.

* * * * *